US009162383B1

(12) United States Patent
Serafini et al.

(10) Patent No.: US 9,162,383 B1
(45) Date of Patent: Oct. 20, 2015

(54) METHOD AND APPARATUS FOR INJECTION MOLDING ELONGATED OBJECTS

(71) Applicant: RAS INNOVATIVE MOLDING SOLUTIONS, LLC, Gastonia, NC (US)

(72) Inventors: Bradley D. Serafini, Clover, SC (US); Henry B. Lewandowski, Orchard Park, NY (US)

(73) Assignee: RAS Innovative Molding Solutions, LLC, Gastonia, NC (US)

( * ) Notice: Subject to any disclaimer, the term of this patent is extended or adjusted under 35 U.S.C. 154(b) by 0 days.

(21) Appl. No.: 14/516,038

(22) Filed: Oct. 16, 2014

(51) Int. Cl.
*B29C 45/17* (2006.01)
*B29C 33/30* (2006.01)
*B29K 101/00* (2006.01)

(52) U.S. Cl.
CPC ............. *B29C 45/1756* (2013.01); *B29C 33/30* (2013.01); *B29K 2101/00* (2013.01)

(58) Field of Classification Search
CPC . B29C 45/1756; B29C 33/30; B29K 2101/00
See application file for complete search history.

(56) References Cited

U.S. PATENT DOCUMENTS

2011/0129561 A1* 6/2011 Adas et al. .................... 425/564

* cited by examiner

*Primary Examiner* — Michael C Miggins
(74) *Attorney, Agent, or Firm* — Trego, Hines & Ladenheim, PLLC

(57) ABSTRACT

Injection molding apparatus includes: a mold structure having a main axis and a mold cavity; a core in the mold cavity, defining a mold envelope bounded by an inner sidewall, an inner endwall at one end of the inner sidewall, an outer sidewall spaced apart from the inner sidewall, and an outer endwall spaced apart from the inner endwall; a nozzle at an end of the cavity, including an interior channel communicating with the mold envelope; a pin in the nozzle, moveable between a closed position forming a part of the outer endwall and blocking flow between the interior channel and the mold envelope, and an open position permitting fluid flow; and a locking pin within the core and moveable between a retracted position free of the outer endwall, and an extended position received within the outer endwall, preventing relative lateral movement of the core and the mold cavity.

6 Claims, 4 Drawing Sheets

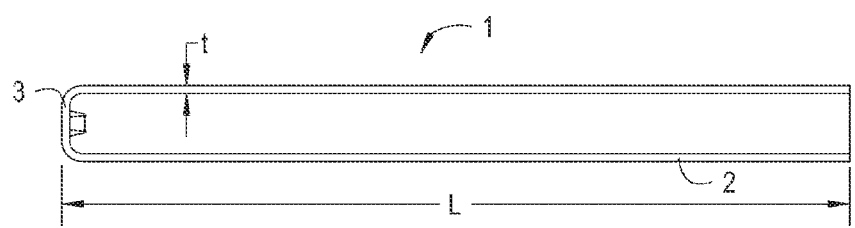
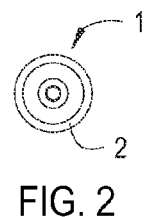
FIG. 1
FIG. 2
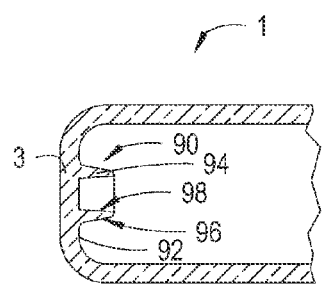
FIG. 7

METHOD AND APPARATUS FOR INJECTION MOLDING ELONGATED OBJECTS

BACKGROUND OF THE INVENTION

This invention relates generally to injection molding and more particularly to apparatus and methods for injection molding elongated objects having a high aspect ratio.

injection molding is a well-known process in which plastic is melted, then forced into the cavity of a mold and then allowed to solidify, resulting in finished parts. The temperatures and pressures used in the molding process are significant. For example, the fluid plastic may be injected a pressure of about 207 mPa (30,000 lbf/in$^2$) and a temperature between 260 to 316° C. (500 to 600° F.).

Some part geometries are challenging to produce through injection molding. For example, FIGS. 1 and 2 illustrate an exemplary part 1 which has been injection molded and therefore has a structure which may be described as unitary or monolithic. The part 1 has a generally cylindrical sidewall 2 closed off at one end by an endwall 3. The ratio of the overall length "L" of the part 1 to the thickness "t" of the sidewall 2 is quite high, for example the ratio may be on the order of 100.

A mold cavity for making such elongated parts typically includes a cylindrical cavity with a long cylindrical core disposed coaxially therein. When plastic (for example polyethylene terephthalate or "PET") is injected, it tends to flow into the space between the two mold components asymmetrically. This causes unavoidable lateral shift of the core. Core shift results in a lower-quality part, increases the chance of total rejects (e.g. because of voids in the part), and can result in damaging contact between the core and the cavity.

Accordingly, there is a need for an apparatus and method for productive, reliable injection molding of elongated parts.

BRIEF SUMMARY OF THE INVENTION

This need is addressed by the present invention, which according to one aspect provides a mold assembly including a mold core with a retractable locking pin effective to stabilize the core during the molding process.

According to one aspect of the invention, an injection molding apparatus having a main axis includes: a mold structure including a mold cavity therein; an elongated core disposed in the mold cavity such that a mold envelope is defined between the mold cavity and the core, the mold envelope being bounded by an inner sidewall, an inner endwall disposed at an end of the inner sidewall, an outer sidewall spaced apart from the inner sidewall, and an outer endwall spaced apart from the inner endwall; a nozzle disposed adjacent the outer endwall, including an interior channel in fluid communication with the mold envelope; a valve gate pin disposed in the nozzle and moveable along the main axis between a closed position in which it forms a part of the outer endwall and blocks fluid flow between the interior channel and the mold envelope, and an open position in which it permits fluid flow between the interior channel and the mold envelope; and a locking pin disposed within the core and moveable along the main axis between a retracted position in which the locking pin is free of the outer endwall, and an extended position in which the locking pin is received within the outer endwall so as to prevent relative lateral movement of the core and the mold cavity.

According to another aspect of the invention, the mold structure includes: a mold block which defines the outer sidewall of the mold envelope; and a valve block positioned axially adjacent to the mold block and including an end cavity which defines the outer endwall of the mold envelope.

According to another aspect of the invention, the valve block includes a chamber with an endwall opposite the end cavity; and the nozzle is disposed in the chamber, with a nozzle end of the nozzle spaced a short distance from the endwall.

According to another aspect of the invention, the mold structure includes an injection orifice defined in the outer endwall, the orifice being coaxially aligned with the valve gate pin and the locking pin.

According to another aspect of the invention, a tip of the locking pin includes one or more shallow slots formed around its periphery.

According to another aspect of the invention, the core includes an end face that defines the inner endwall of the mold envelope, the end face including a void that receives the locking pin.

According to another aspect of the invention, an overall length of the mold envelope measured parallel to the main axis is about 100 times greater than a distance between the inner and outer sidewalls.

According to another aspect of the invention, the apparatus further includes a first actuator operable to move the valve gate pin between the open and closed positions.

According to another aspect of the invention, the apparatus further includes a second actuator operable to move the locking pin between the extended and retracted positions.

According to another aspect of the invention, an injection molding method includes: assembling an injection molding apparatus having a main axis, including: a mold structure having a main axis and including a mold cavity therein; and an elongated core disposed in the mold cavity such that a mold envelope is defined between the mold cavity and the core, the mold envelope being bounded by an inner sidewall, an inner endwall disposed at one end of the inner sidewall, an outer sidewall spaced apart from the inner sidewall, and an outer endwall spaced apart from the inner endwall; extending a locking pin from the core and into the outer endwall so as to prevent relative lateral movement of the core and the mold block; injecting fluid plastic into the mold envelope from a nozzle past a valve gate pin in an open position; as the plastic is being injected, retracting the locking pin and moving the valve gate pin to a closed position where it defines a portion of the outer endwall.

According to another aspect of the invention, the mold structure includes an injection orifice defined in the outer endwall, the orifice being coaxially aligned with the valve gate pin and the locking pin.

According to another aspect of the invention, a tip of the locking pin includes one or more shallow slots formed around its periphery, and during the step of injecting fluid plastic, the plastic flows through the shallow slots from the nozzle to the mold envelope.

According to another aspect of the invention, the core includes an end face that defines the inner endwall of the mold envelope, the end face including a void that receives the locking pin; and during the step of injecting fluid plastic, the plastic initially flows into the void.

According to another aspect of the invention, a first actuator is operable to move the valve gate pin from the open position to the closed position; and a second actuator is operable to move the locking pin from the extended position to the retracted positions; and operation of the first and second actuators is initiated by a timer which is started when the step of injecting fluid plastic begins.

According to another aspect of the invention, a part includes: a monolithic structure including a sidewall with a closed perimeter, an endwall closing off one end of the sidewall, and a boss extending axially inward from an interior surface of the endwall.

According to another aspect of the invention, the boss has a perimeter wall with a frustoconical outer surface and a tapered inner surface.

According to another aspect of the invention, the monolithic structure comprises molded plastic.

According to another aspect of the invention, an overall length of the part is about 100 times greater than a thickness of the sidewall.

BRIEF DESCRIPTION OF THE DRAWINGS

The invention may be best understood by reference to the following description taken in conjunction with the accompanying drawing figures in which:

FIG. 1 is a side view of a part made using the apparatus and method of the present invention;

FIG. 2 is an end view of the part of FIG. 1;

FIG. 7 is an enlarged, cross-sectional view of a portion of the part of FIG. 1.

DETAILED DESCRIPTION OF THE INVENTION

Figure 3:
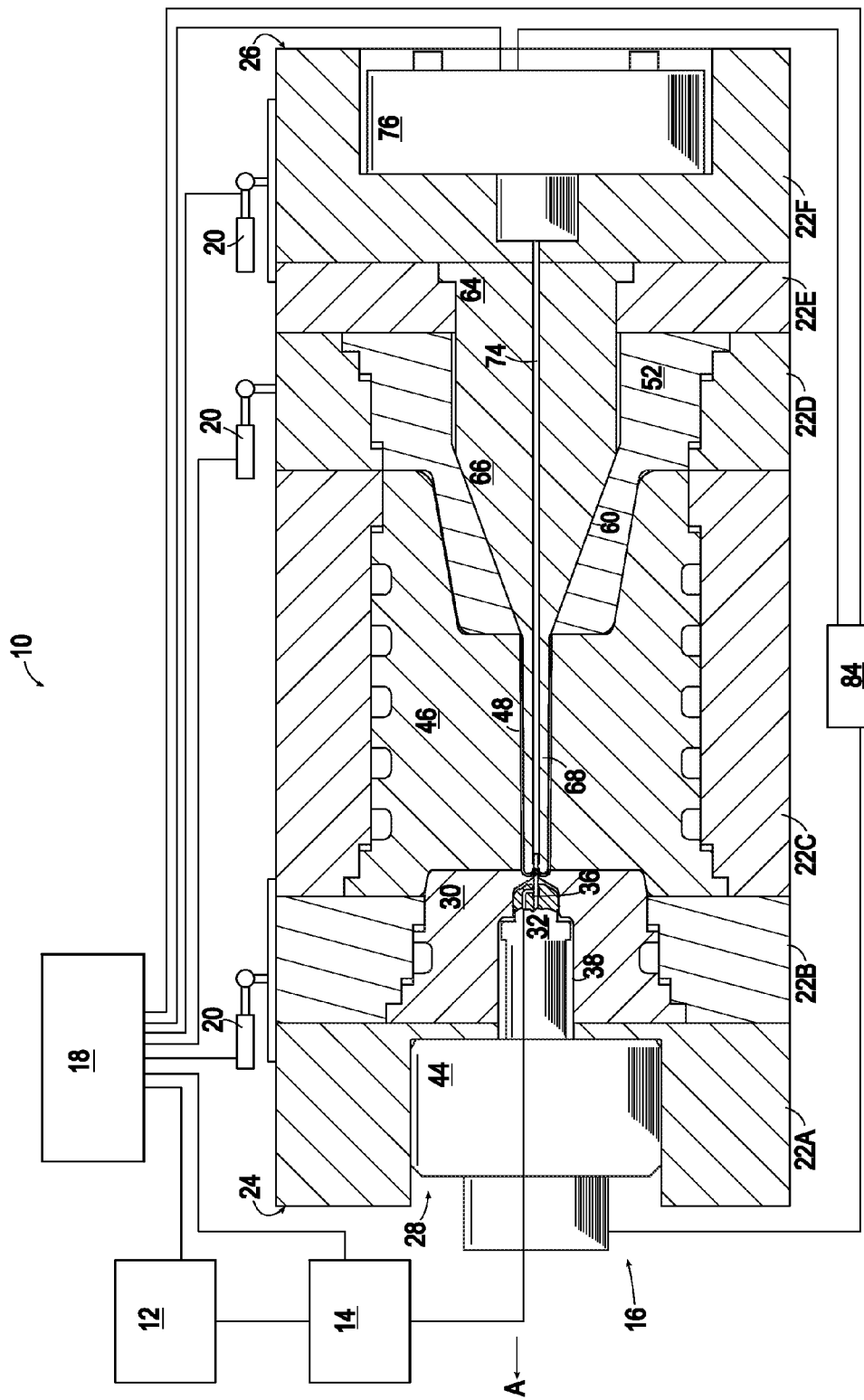
FIG. 3 is a schematic, partially cross-sectioned diagram of a molding apparatus constructed according to an aspect of the present invention.
Figure 4:
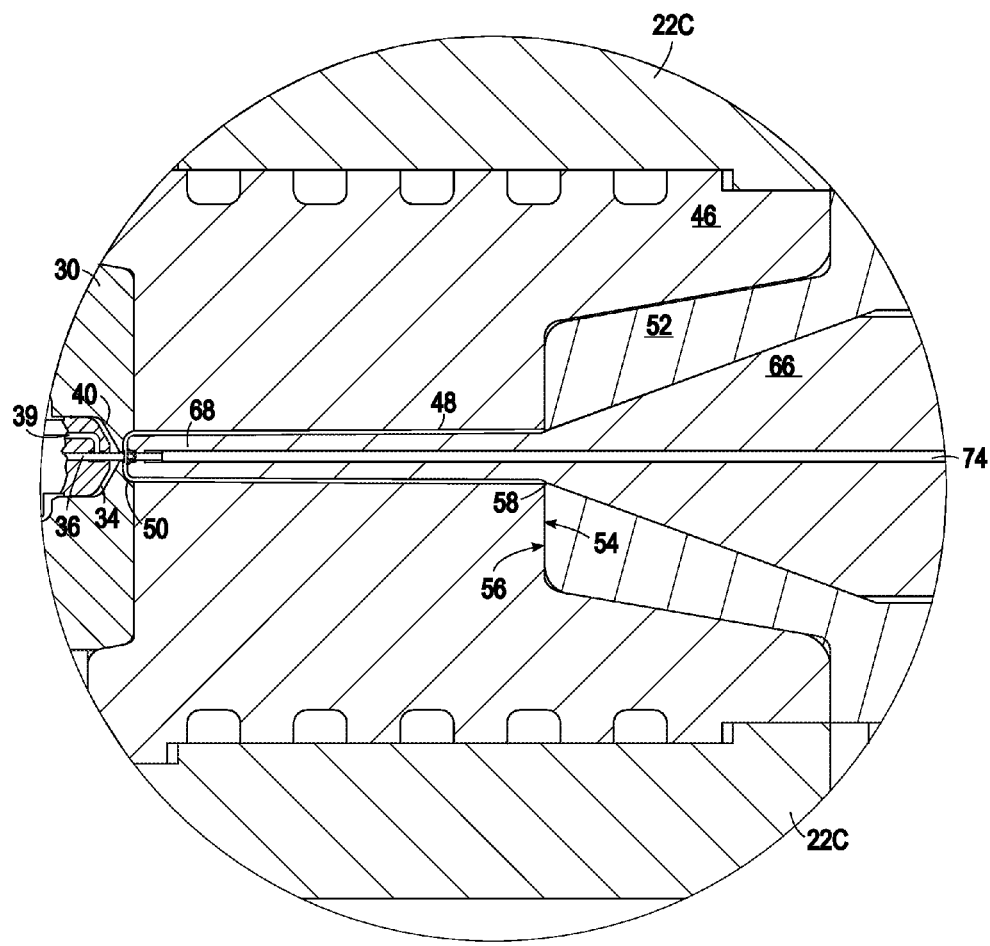
FIG. 4 is an enlarged view of a portion of FIG. 3.

Referring to the drawings wherein identical reference numerals denote the same elements throughout the various views, FIGS. 3 and 4 illustrate an injection molding apparatus 10 constructed according to an aspect of the present invention which is useful for molding plastic parts in general, and especially elongated parts as shown in FIG. 1. The basic components of the injection molding apparatus 10 include a plastic supply 12, a molder/extruder 14, a mold assembly 16, and a controller 18.

The plastic supply 12 comprises apparatus of a known type such as a hopper, tank, etc. suitable for storing and dispensing plastic in the form of small solid pellets.

The molder/extruder 14 is a known type of device operable to receive the plastic from the plastic supply 12, melt it to an appropriate temperature so that it forms a viscous fluid, and inject the fluid into the mold assembly 16 at suitable temperatures and pressures. For example, the fluid plastic may be injected at about 207 mPa (30,000 lbf/in$^2$) and between 260 to 316° C. (500 to 600° F.).

The mold assembly 16 includes a cavity which receives the fluid plastic. After injection, the plastic cools and solidifies in the cavity, which is then opened to eject the finished part. One or more actuators 20 are coupled to the mold assembly 16 and are used to open and close various portions of the mold assembly 16 during the molding procedure. The specific type of actuator is not critical and may be electrical, pneumatic, or hydraulic, for example.

The controller 18 comprises apparatus effective to control one or more aspects of the operation of the injection molding apparatus 10. It may be implemented as a general-purpose electronic computer, as one or more application-specific electronic processors, or as one or more discrete mechanical or electrical components or modules. The controller 18 is depicted with single-line connections indicating control and/or sensing paths to the plastic supply 12, molder/extruder 14, and actuators 20, 44, 76.

Figure 5:
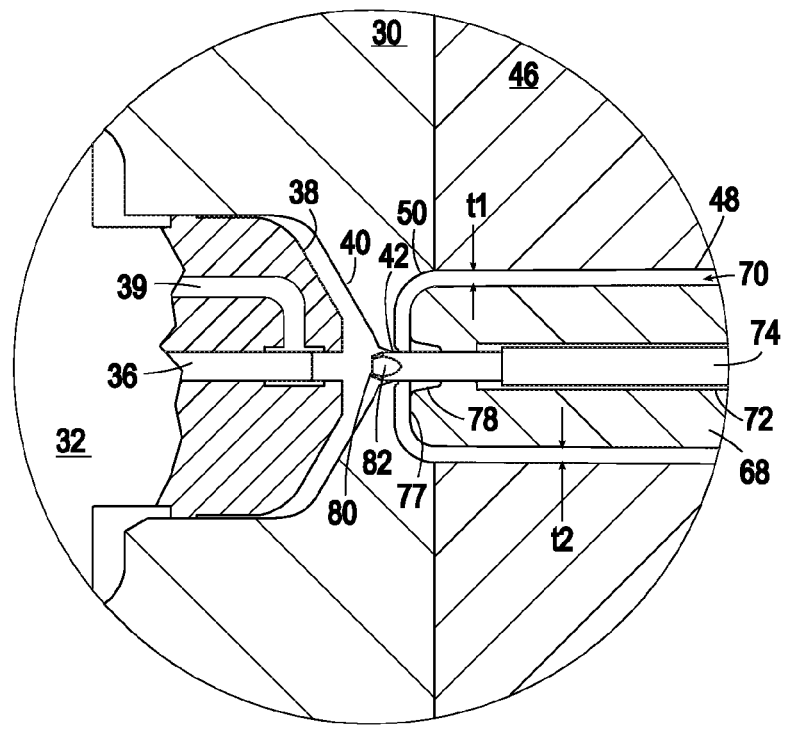
FIG. 5 is an enlarged cross-sectional view of a portion of a mold assembly shown in FIG. 3, in a first position.

Referring to FIGS. 3, 4, and 5, the mold assembly 16 will now be described in more detail. In the illustrated example, the mold assembly 16 is modular in nature, being built up from several plates 22A-22F. Each plate 22A-22F has a pair of parallel, spaced-apart mating faces. The mating faces of adjacent plates 22A-22F abut each other when the assembly is closed. Each plate 22A-22F incorporates one or more functional components of the mold assembly 16. The individual plates 22A-22F can be coupled to each other or to static structure in any combination. Furthermore, single plates 22A-22F or groups of plates 22A-22F may be mounted to the actuators 20, so as to be selectively moveable along a main axis "A". Stated another way, groups of the plates 22A-22F may be pushed together or pulled apart along the main axis A to effect opening and closing of the mold assembly 16. It is noted that the principles of the present invention are equally applicable to other mold configurations which are not modular in nature.

The mold assembly 16 has a front end 24 and an rear end 26. Movement of a component towards the front end 24 may be described as "forward" motion and movement towards the rear end 26 may be described as "aft" motion. These directional terms are used herein solely for the purpose of convenience in description and do not imply that any particular orientation of the components described is required.

Considering FIG. 3 from left to right along the main axis A, the first two plates 22A, 22B carry a valve assembly 28 and a valve block 30. The valve assembly 28 includes a valve nozzle 32 with a frustoconical nozzle end 34 and a cylindrical valve gate pin 36. The valve block 30 includes a chamber 38 that receives the valve nozzle 32. One end of the chamber 38 is closed off by a conical endwall 40 that matches the shape of the nozzle end 34. The nozzle end 34 is spaced a short distance from the endwall 40. An injection orifice 42 sized to receive the valve gate pin 36 extends through the center of the endwall 40. The valve assembly 28 also includes an actuator 44 operable to selectively move the valve gate pin 36 so that it is in contact with the injection orifice 42 or retracted away from the orifice 42. in the retracted position, a fluid flowpath is open between an interior channel 39 of the valve nozzle 32 and the injection orifice 42. In operation the molder/extruder 14 described above supplies the pressurized fluid plastic to the interior channel 39 of the nozzle 32.

The next plate 22C carries a mold block 46 which has an internal block cavity 48. The block cavity 48 is shaped and sized to define a portion of the outer surface contours of the part 1. In the specific example illustrated, the left end of the block cavity 48 mates with a domed end cavity 50 in the valve block 30. Collectively the block cavity 48 and the end cavity 50 constitute a mold structure and cooperatively define a complete mold cavity. This end cavity 50 communicates with the injection orifice 42.

The next plate 22D carries an ejector 52 which has a generally frustoconical shape with an end face 54 that mates against an aft face 56 of the mold block 46. The end face 54 has a hole 58 formed therein which is slightly smaller in diameter than the block cavity 48, and a conical bore 60 that communicates with the hole 58.

The next plate 22E carries a core element 62. The core element 62 includes a cylindrical main body 64, a conical transition section 66, and a cylindrical core 68. The transition section 66 is sized and shaped to mate with the conical bore 60 of the ejector 52 when the mold assembly 16 is closed. The transition section 66 is also shaped and sized to close off the aft end of the block cavity 48 when the mold assembly 16 is closed. The core 68 is shaped and sized to define the interior surface contours of the part 1. When the mold assembly 16 is closed, the core 68 is positioned coaxially within the block cavity 48 but not touching it, the space between the two components defining a mold envelope 70 that is filled with fluid plastic during molding process.

Generally stated, the mold envelope 70 is bounded by an inner sidewall, an inner endwall disposed at one end of the inner sidewall, an outer sidewall spaced apart from the inner sidewall, and an outer endwall spaced apart from the inner endwall. The sidewalls each have a closed perimeter, and can take on any shape such as circular, elliptical, or polygonal. In the specific example illustrated, the outer sidewall is defined by the block cavity 48, the inner sidewall and the inner endwall are defined by the core 68, and the outer endwall is defined by the end cavity 50 in the valve block 30; however different arrangements are possible. For example, the end cavity 50 could be eliminated and the core 68 simply spaced away from the valve block 30 to define the outer and inner endwalls.

A central bore 72 extends through the core element 62, and a locking pin 74 is received in the central bore 72, mounted so that it can move back and forth parallel to the main axis A. The aft end of the locking pin 74 is coupled to an actuator 76 carried in the last plate 22F. The actuator 76 is operable to selectively extend or retract the locking pin 74.

FIG. 5 illustrates the spatial relationship of the valve block 30, valve nozzle 32, core 68, and locking pin 74 in more detail. The flat end face 77 of the core 68 includes a generally frustoconical void 78 that receives the tip 80 of the locking pin 74. The tip 80 of the locking pin 74 is chamfered and includes one or more shallow slots 82 formed around its periphery. FIG. 5 shows the locking pin 74 in its extended position. In this position, the tip 80 is registered in the injection orifice 42 of the valve block 30, and functions to prevent any relative lateral movement of the core 68 inside the block cavity 48. The shallow slots 82 communicate with the interior channel 39 and the block cavity 48, and provide a flow path for fluid plastic.

The molding operation will now be described in sequence. Initially, the mold assembly 16 is closed with the valve block 30 abutting the mold block 46 and defining the mold envelope 70 as shown in FIG. 5. The locking pin 74 is extended into the injection orifice 42 of the valve block 30, and the valve gate pin 36 is in an open position.

During the actual mold "shot", plastic in a fluid state is forced past the valve gate pin 36, through the slots 82 in the locking pin tip 80, and begins to flow into the mold envelope 70. At the very beginning of this process the plastic enters the frustoconical void 78 in the core 68, where it surrounds the locking pin 74 and begins to solidify. This has the effect of rigidly locking the relative lateral position of the locking pin 74 to the core 68, and the combination of those two elements to the valve block 30. This prevents lateral shifting of the core 68 relative to the block cavity 48.

Subsequently, fluid plastic flows around the end of the core 68 and into the mold envelope 70. During this process the plastic may flow asymmetrically down the elongated sides, resulting in significant lateral pressure on the core 68. However, the stabilization provided by the locking pin 74 prevents deflection of the core 68. Stated another way, the part wall thickness "t1" on one side of the core 68 remains substantially equal to the part wall thickness "t2" on the opposite side.

Figure 6:
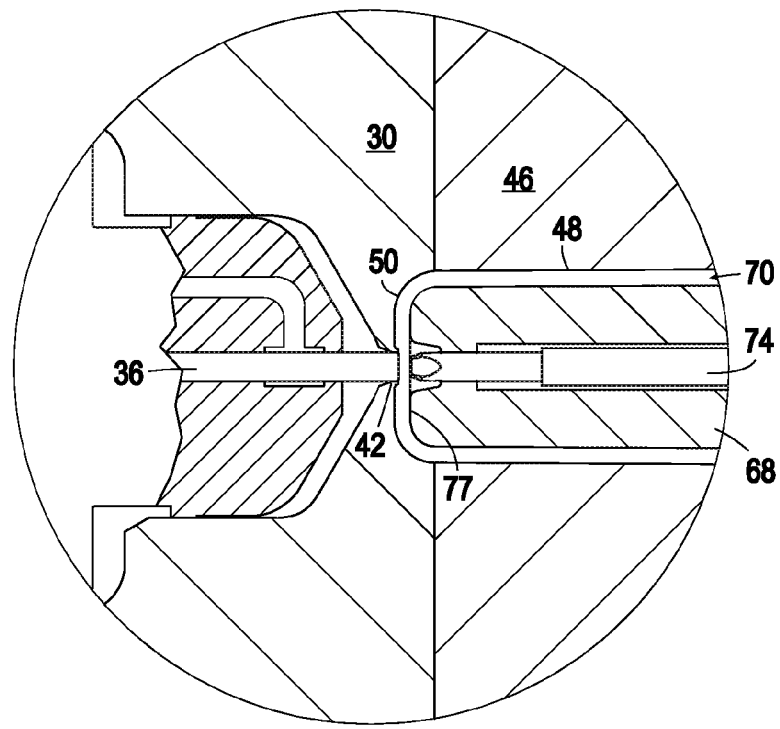
FIG. 6 is an enlarged cross-sectional view of a portion of a mold assembly shown in FIG. 3, in a second position.

As the mold envelope 70 nears complete filling, the locking pin 74 is retracted as shown in FIG. 6, creating a flow path into the frustoconical void 78. Simultaneously, the valve gate pin 36 is extended rearward, extruding a small volume of plastic into the opening left by the locking pin 74. Once this volume of plastic solidifies, it closes off the endwall 3 of the part 1. This entire process is rapid, for example it may take less than one second. Subsequently, the mold assembly 16 is opened, exposing the part 1, and the part 1 is ejected from the block cavity 48 by moving the ejector 52 forward. The mold assembly 16 is then re-closed, ready to form another product.

The steps of the injection process may be controlled by various means. For example, a discrete electronic or mechanical timer (shown schematically at 84 in FIG. 3) may be started when the mold shot is initiated by the controller 18. The timer 84 counts a predetermined time and then signals the locking pin 74 and valve gate pin 36 to begin their movement. Alternatively, a timer could be incorporated into the software or hardware of the controller 18 itself.

An example of a resulting part 1 is shown in FIGS. 1, 2, and 7. As noted above, the part 1 is unitary or monolithic molded plastic and has a closed perimeter sidewall 2, which can take on any shape such as circular, elliptical, or polygonal. In the specific example illustrated, the sidewall 2 is generally cylindrical. The sidewall 2 is closed off at one end by an endwall 3. The ratio of the overall length "L" of the part 1 to the thickness "t" of the sidewall 2 is quite high, for example the ratio may be on the order of 100. A boss 90 extends axially from an interior surface 92 surface of the endwall 3. The boss 90 is annular, with a closed perimeter wall 94 and one open end. The outer surface 96 of the perimeter wall 94 matches the shape of the frustoconical void 78 described above. The inner surface 98 of the perimeter wall matches the chamfered shape of the tip 80 of the locking pin 74. The shape of the boss 90 is defined by fluid plastic flowing into the space between the void 78 and the locking pin 74 during the molding process, as described above. The presence of the boss facilitates the use of the molding method described above, which results in the sidewall 2 having a highly uniform thickness around its periphery.

The method and apparatus described above provides a means for molding plastic parts. It is especially useful for producing elongated parts with good quality and good yields while protecting the molding equipment from damages. These principles may be applied to molding all kinds of plastic parts as well as the molding of other materials where support of a core within a mold is necessary or desirable, such as elastomers and low-melting-point metals.

The foregoing has described a method and apparatus for injection molding. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying potential points of novelty, abstract and drawings), or to any novel one, or any novel combination, of the steps of any method or process so disclosed.

What is claimed is:

1. An injection molding method, comprising:
assembling an injection molding apparatus having a main axis, including:
a mold structure having a main axis and including a mold cavity therein; and
an elongated core disposed in the mold cavity such that a mold envelope is defined between the mold cavity and the core, the mold envelope being bounded by an inner sidewall, an inner endwall disposed at one end of the inner endwall, an outer sidewall spaced apart from the inner sidewall, and an outer endwall spaced apart from the inner endwall;
extending a locking pin from the core and into the outer endwall so as to prevent relative lateral movement of the core and the mold block;
injecting fluid plastic into the mold envelope from a nozzle past a valve gate pin in an open position;
as the plastic is being injected, retracting the locking pin and moving the valve gate pin to a closed position where it defines a portion of the outer endwall.

2. The method of claim 1 wherein the mold structure includes an injection orifice defined in the outer endwall, the orifice being coaxially aligned with the valve gate pin and the locking pin.

3. The method of claim 1 wherein a tip of the locking pin includes one or more shallow slots formed around its periphery, and during the step of injecting fluid plastic, the plastic flows through the shallow slots from the nozzle to the mold envelope.

4. The method of claim 1 wherein:
the core includes an end face that defines the inner endwall of the mold envelope, the end face including a void that receives the locking pin; and
during the step of injecting fluid plastic, the plastic initially flows into the void.

5. The method of claim 1 wherein an overall length of the mold envelope measured parallel to the main axis is about 100 times greater than a distance between the inner and outer sidewalls.

6. The method of claim 1 wherein:
a first actuator is operable to move the valve gate pin from the open position to the closed position; and
a second actuator is operable to move the locking pin from the extended position to the retracted positions; and
operation of the first and second actuators is initiated by a timer which is started when the step of injecting fluid plastic begins.

* * * * *